United States Patent [19]

Grosse et al.

[11] Patent Number: 5,734,886
[45] Date of Patent: Mar. 31, 1998

[54] DATABASE DEPENDENCY RESOLUTION METHOD AND SYSTEM FOR IDENTIFYING RELATED DATA FILES

[75] Inventors: Eric Grosse, Berkeley Heights; David Leo Presotto, Oldwick, both of N.J.

[73] Assignee: Lucent Technologies Inc., Murray Hill, N.J.

[21] Appl. No.: 340,692

[22] Filed: Nov. 16, 1994

[51] Int. Cl.$^6$ .................................................. G06F 17/30
[52] U.S. Cl. ..................... 395/604; 395/602; 395/601; 395/610; 395/613; 395/616; 395/200.48
[58] Field of Search ................................... 395/600, 601, 395/602, 604, 613, 610, 616, 300.48; 364/200; 230/575

[56] References Cited

U.S. PATENT DOCUMENTS 2,361,357  11/1944  Kionka ................................. 395/700
5,008,786   4/1991  Thatte ................................. 364/200

OTHER PUBLICATIONS

Gibbs et al., "Navigating The Internet", Sams Publishing, IN, Jan. 1993, pp. 35–86, and 158–172.
Eggert et al., "File Systems in User Space", Winter Usenix, Jan. 1993.
Herman C. Rao and Larry L. Peterson, "Accessing Files in an Internet: The Jade File System", IEEE, vol. 19, No. 6, pp. 613–624, Jun. 1993.
Schwartz, Hardy, Heinzman, and Hirschowitz, "Supporting Resource Discovery Among Public Internet Archives Using a Spectrum of Information Quality", IEEE, pp. 82–89, Jan. 1991.
Dongarra, J., and Grosse, E., "Distribution of Mathematical Software via Electronic Mail," Comm. ACM, vol. 30, 1987, pp. 403–407.
Eggert, P.R., and Parker, D.S., "File Systems in User Space," USENIX Conference Proceedings, Winter 1993, pp. 229–240.
Gifford, D.K., et al., Semantic File Systems, Operating System Review, vol. 25, No. 5, 1991, pp. 16–25.
Gibbs, M., and Smith, R., "Navigating the Internet," Chaps. 3, 4, and 9, Sams Publishing, IN, 1993, pp. 35–86, and 158–172.
Aho, A. et al., "The Design and Analysis of Computer Algorithms," Sect. 5.7, Addison–Wesley, 1974, pp. 198–199.
Anonymous, "IBM Technical Disclosure Bulletin", Jun. 1992, vol. 35, No. 1A, pp. 182–183.

*Primary Examiner*—Thomas G. Black
*Assistant Examiner*—Cheryl R. Lewis

[57] ABSTRACT

A method and system for displaying names of data files in a collection of data files represented by a corresponding symbol. According to one embodiment of the present invention, a user may display a listing of subroutine library files required to execute a particular subroutine. In such an embodiment, the user may enter the subroutine name as the symbol of interest and the system would display the library file containing that subroutine as well as those data files that contain subroutines called by that subroutine of interest. The present invention uses a transitive closure technique to traverse a data structure generated from a database and retrieve the data file list. The transitive closure technique enables the use of a compact database that contains only the data file names, corresponding symbol names, and symbol names of only data files for each data file that are directly related to that data file.

19 Claims, 3 Drawing Sheets

DATABASE DEPENDENCY RESOLUTION METHOD AND SYSTEM FOR IDENTIFYING RELATED DATA FILES

FIELD OF THE INVENTION

The invention relates generally to file server computer systems, and more specifically to the displaying of data fie names contained in a collection of related data files represented by a corresponding symbol.

BACKGROUND OF THE INVENTION

Computer systems, such as file servers, make information and resources accessible to users on remote computer systems in the form of data files transmitted over a common network, such as the Internet. Typically, users or clients utilize standard network communications protocols, such as E-mail or file transfer protocol ("FTP"), to communicate with the file servers for requesting the transfer of desired information or data file. Upon receiving such a request, the file servers will transmit back the requested data file.

Data files available from fie servers often contain text regarding a particular subject, graphics information or voice information. Data files may also contain computer programs or subroutines that perform specific tasks. Particular data files may be related to, or dependent on, other data files. Examples of related data files include data files containing information concerning a common subject, bibliography citations used in a document and graphics data files of images in a photograph collection. Examples of dependent data files include computer routines which contain calls to subroutines located in other data files. Retrieving a copy of the particular computer routine data file alone will not enable a user to execute the routine without also retrieving those data files containing copies of the called subroutines.

One file server computer system connected to the Internet at E-mail address "neflib@research.att.com" ("NETLIB fileserver") provides computer subroutine files for mathematical algorithms which may be dependent on other subroutine files. The NETLIB file server enables a user to request a copy of a particular subroutine and then receive a copy of the library data file containing that subroutine as well as those data files that contain subroutines that are called by the request subroutine. In order to use this facility, a user must make a request for a copy of a particular symbol, such as the name of the subroutine contained in the library data file. A more derailed description of the NETLIB file server is provided in Dongarra I., and Crosse, E., *Distribution of Mathematical Software via Electronic Mail*, Comm. ACM, Vol. 30, pp. 403–407 (1987).

The ability to automatically display a list of data file names that would be returned from the file server by requesting a particular symbol would be convenient. This file name information can be helpful when one already has an entire library and wants to know what additional files are needed to perform a particular function. The representation of abstract objects or processes, such as lazy checkout of directories, by a file system is described in Eggert, P. R. and Parker, D. S., *File Systems in User Space*, USENIX Conference Proceedings, pp. 229–240 (Winter 1993), and Gifford, D. K., Jouvelot, P., Sheldon, M. A., O'Toole, Jr., J. W., *Semantic File Systems*, Operating System Review, Vol. 25, No. 5, pp. 16–25 (1991), which are incorporated by reference herein.

Therefore, a need exists for a convenient method for displaying the data file names of a particular data file collection represented by a corresponding symbol.

SUMMARY OF THE INVENTION

A database dependency resolution method and system in accordance with the present invention enables a user to automatically obtain a list identifying a data file name represented by a particular symbol and the corresponding names of data files related to that data file. For example, the data files may be subroutine libraries with the symbol being the name of a subroutine contained therein and the related data files are those subroutine library files which contain subroutines called by the subroutine represented by the symbol. A user may request a list of data files from the processing system that are associated with the symbol or subroutine of interest. The processing system then returns the name of the data files that contain the subroutine as well as all the names of those data files which contain subroutines called by the subroutine of interest.

In accordance with one aspect of the present invention, a database dependency resolution method may be used with a relationship database that contains the data file names, at least one symbol name for each of the data file names, and symbol names corresponding to related data files. The method generates a data structure representing relationship hierarchies of data files and symbols as contained in the database, retrieves the symbol of interest, and traverses the relationship hierarchies of the generated data structure using a transitive closure technique. By traversing the data structure, the method retrieves information concerning the name of the data file corresponding to the symbol of interest and the names of any directly and indirectly related data files. The retrieved information is then arranged into a predetermined format for displaying.

In accordance with a second aspect of the invention, a processing system, such as a file server, that performs the database dependency resolution method may consist of a processing unit and memory storage devices that contain the relationship database of minimal size. The database of minimal size may contain the data file names, corresponding symbol names, and only those symbol names of data files that are directly related to the respective data files.

The usage of a transitive closure technique for identifying names of related data files enables the present invention to employ such a relationship database of minimal size because the technique is capable of traversing a data structure that is based on symbols of only directly related data files and not indirectly related data files. Further, since the database only needs to contain the directly related symbols, the database can be automatically generated by a simple routine which scans each data files and identifies the symbols of the related data files. Thus, the present invention not only provides a convenience to users in identifying the names of data files contained in a particular collection, but also is a minimal burden to the file server administrator in its creation and maintenance.

Additional features and advantages of the present invention will become apparent by reference to the following detailed description and accompanying drawings.

DETAILED DESCRIPTION

Figure 1:
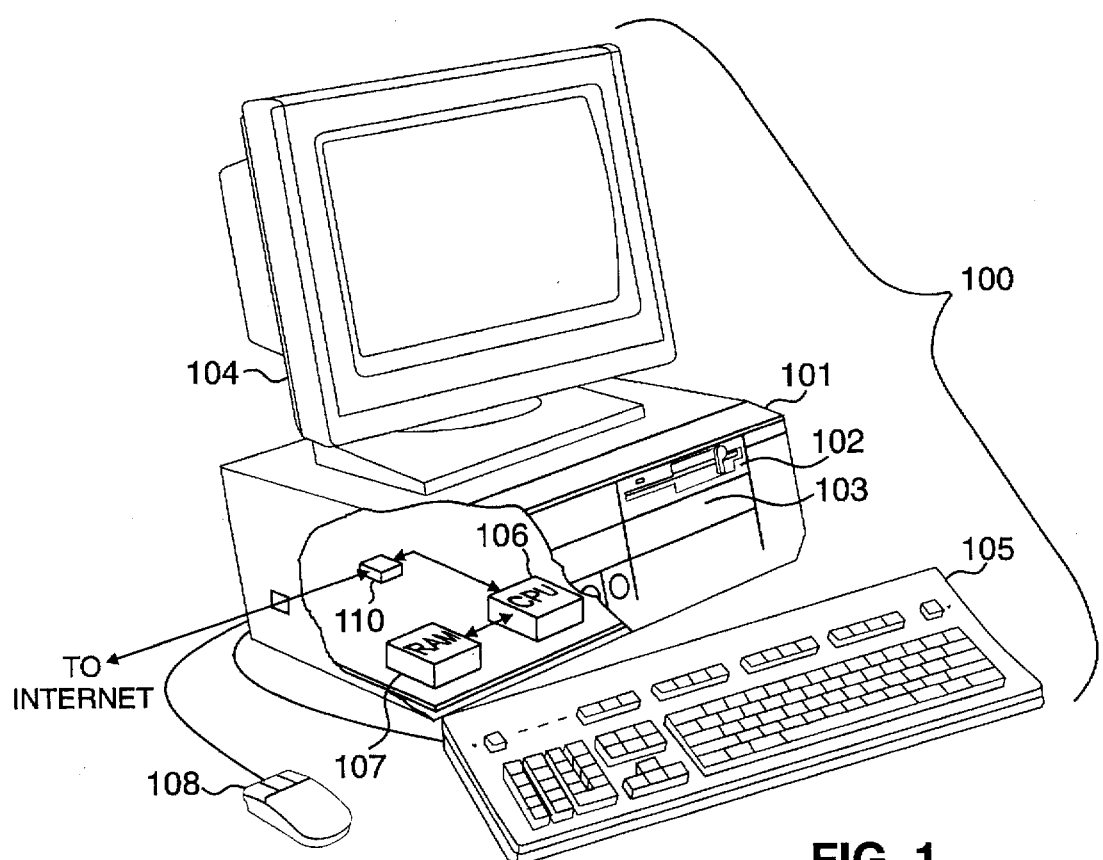
FIG. 1 is an isometric view of a file server computer which may function in accordance with the present invention.

FIG. 1 illustrates an isometric view of a file server computer 100 which may function in accordance with the present invention. The file server computer 100 is comprised of a hardware casing 101 (illustrated as having a cut-away view), a monitor 104, a keyboard 105 and optionally a mouse 108. Note that the monitor 104, the keyboard 105 and the mouse 108 may be replaced by any suitably arranged output and input devices, respectively. The hardware casing 101 includes both a floppy disk drive 102 and a hard disk drive 103. The floppy disk drive 102 is operable to receive, read and write to external disks, while the hard disk drive 103 is operable to provide fast access data storage and retrieval. The file server computer 100 may also be equipped with any suitably arranged structure for receiving and transmitting data, including, for example, tape and compact disc drives, and serial and parallel data ports.

Within the cut away portion of the hardware casing 101 is a processing unit, such as a central processing unit ("CPU") 106, coupled with a memory storage device, which in the illustrated embodiment is a random access memory ("RAM") 107. The CPU 106 is further connected to an network interface, such as an Internet interface 110. Suitable network interfaces 110 include those commercially available for connection to the Internet.

The Internet, the network upon which most communications and data transfers take place, is generally defined as any collection of independent or distinct networks operating together as one, and may include a worldwide network of networks that are connected to each other using any one of a number of protocols, such as the Internet Protocol. Protocols provide file transfer, remote log-in, electronic mail and other services, including distributed processing, as well as other resources.

Although the file server computer 100 is shown having a single CPU 106, the computer 100 may be equipped with a plurality of CPUs 106 operable to cooperatively carry out the principles of the present invention. Also, although the computer 100 is shown having a single local memory storage device 107, the computer 100 may be equipped with a plurality of local memory storage devices. Further, although the computer 100 is being used for illustrating one implementation of the present invention, the invention may alternately be implemented within any processing system having at least one processing unit, including, for example, sophisticated calculators and handheld, personal, mini, main frame and super computers, including RISC and parallel processing architectures, as well as within processing system network combinations of the foregoing.

Figure 2:
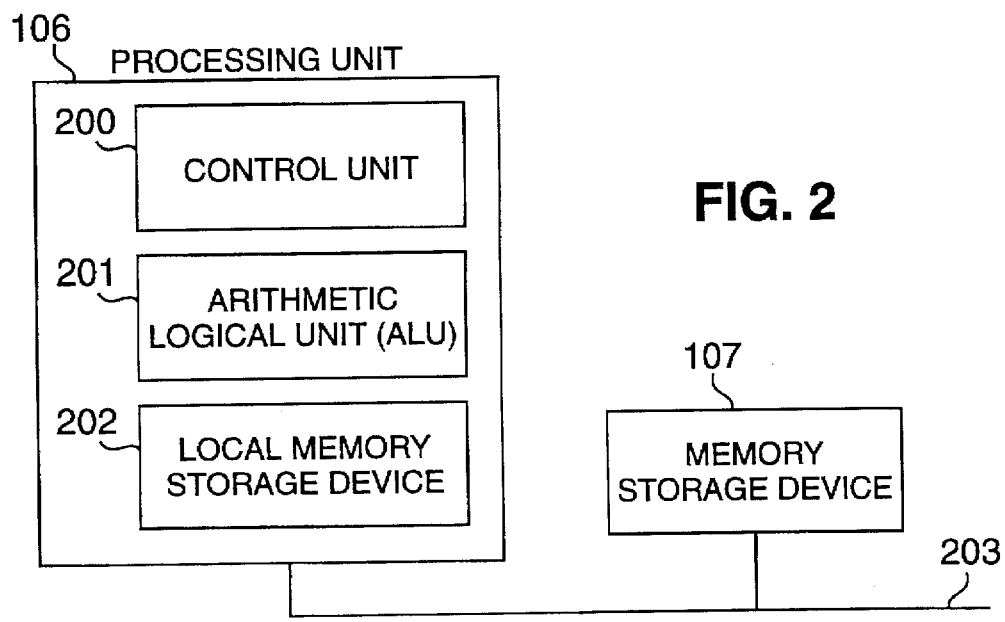
FIG. 2 is a block diagram of a microprocessing system, which may be used in conjunction with the personal computer in FIG. 1.

FIG. 2 illustrates a block diagram of a microprocessing system, which may be used in conjunction with the fie server computer 100 in FIG. 1. The microprocessing system includes a single processing unit, such as the CPU 106, coupled via a data bus 203 with a memory storage device, such as the RAM 107. The memory storage device 107 is operable to store one or more instructions which the processing unit 106 is operable to retrieve, interpret and execute.

The processing unit 106 includes a control unit 200, an arithmetic logic unit ("ALU") 201, and a local memory storage device 202, such as, for example, a stackable cache or a plurality of registers. The control unit 200 retrieves instructions from the memory storage device 107. The ALU 201 performs a plurality of operations, including addition and Boolean AND, needed to carry out instructions. The local memory storage device 202 is operable to provide high speed storage used for storing temporary results and control information.

The file server 100 may generate lists of names of related data files that are represented by corresponding symbols according to the present invention. As used herein, "related data files" includes data files that may be grouped based on a particular relationship, such as common subject matter, as well as data files that are dependent on other data files, such as program subroutines. A suitable symbol may be a name of a program subroutine that is contained within a library data file. The collection corresponding to this symbol consists of the library data file as well as other library data files that contain other subroutines which are called by that subroutine. In creating such lists, the present invention may preferably rely on a corresponding relationship database.

One or more relationship databases may reside within any of the memory devices contained within, or which are accessible to, the file server 100, such as the hard disk drive 103 or the memory storage device 107, shown in FIG. 1. Each relationship database may preferably maintain an organization of specific data file names, corresponding symbol names, and information concerning directly related data files.

An exemplary relationship database which may be employed by the present invention is shown below as Table A.

TABLE A

| |
|---|
| file V; def A, B; ref D, E; |
| file W; def C; |
| file X; def E; |
| file Y; def F; |
| file Z; def D, G; ref E, F. |

The relationship database of Table A contains information fields for symbol names and related data file information for five data files named V, W, X, Y and Z. The data file names appear in a data file name field preceded by the word "file". The corresponding symbol names appear in symbol name fields in the same row as the respective data file names. Each symbol name field is preceded by the term "def". For example, the symbol name corresponding to the data file W is C. Further, if a particular data file entry is directly related to, or dependent on, one or more data files, then the symbol names for those data files are contained in a corresponding related symbol field preceded by the term "ref". For example, the data file V is directly related to the data files having the corresponding symbols D and E. Conversely, if a data file is directly related to no other data file, such as the data file W in Table A, then no related symbol field exists for that data file entry.

A data file may be represented by more than one symbol, as shown with respect to data files V and Z in Table A. The symbol names for data file V are A and B, and the symbol names for data file Z are D and G. The ability to assign more than one symbol name to a data file is important in many applications including those where a particular data file is a subroutine library with each subroutine corresponding to a different task. In such an application, each of symbol names representing that library data file may correspond to a particular one of the subroutines contained in the data file.

The relationship database of Table A further identifies only those symbols corresponding to data files to which a particular data file is directly related, and not symbols for data files to which the particular data file is indirectly related. For example, in Table A the data file V is directly related to the data files corresponding to symbols D and E, which are data files Z and X, respectively. The data file Z is further directly related to data files corresponding to symbols E and F which are data files X and Y, respectively. Therefore, the data file V is indirectly related to the data file Y through its direct relation to the data file Z.

The relationship database configuration shown in Table A minimizes the amount of memory required and administrative burden to maintain the relationship database independent of the number of data files or the hierarchical depth of the depending relationships. Further, the configuration of the relationship database of Table A is such that a simple routine may be created to automatically generate a relationship database. Such a routine may scan each data file maintained by the file server to determine the corresponding subroutine names as symbols and the corresponding called subroutines names as the directly related symbol names. A small relationship database is shown in Table A for illustration purpose only. In many applications of the present invention including typical file servers, the number of data files and related data files would be substantially larger and may be on the order of thousands.

Figure 3:
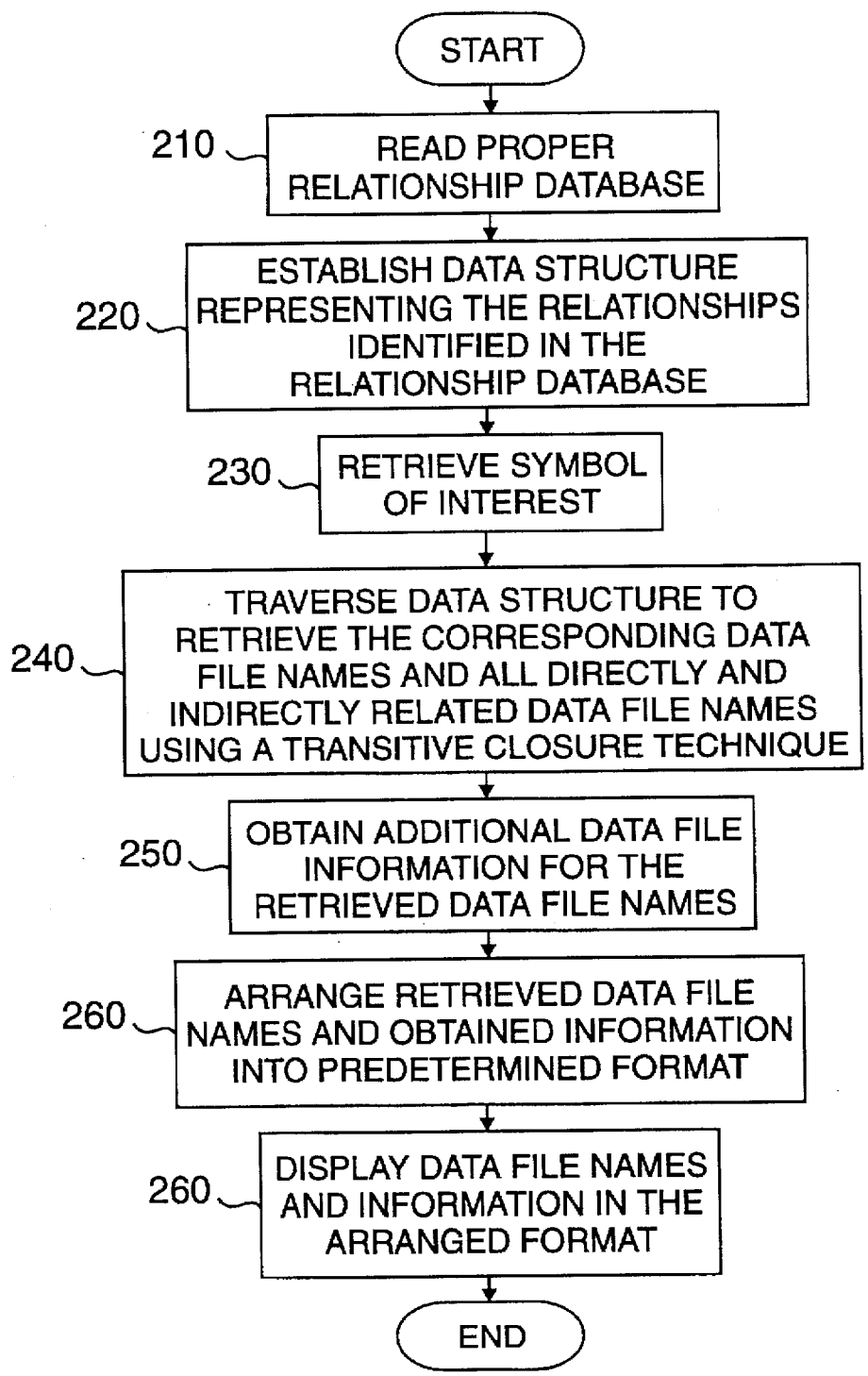
FIG. 3 is a flow diagram of an exemplary database dependency resolution method which may be performed by the processing system of FIG. 2 according to an embodiment of the present invention.

An exemplary database dependency resolution method in accordance with the present invention that is capable of using the relationship database of table A is shown in FIG. 3. According to one aspect of the present invention, the method of FIG. 3 may replace or supplement typical operating system routines for directory and data file listings. According to a second aspect of the present invention, the method of FIG. 3 may be employed in an implementation of a communications protocol, such as File Transfer Protocol ("FTP") or World Wide Web ("WWW"), for transferring files to remote users. A detailed discussion and usage of FTP and WWW are provided in, for example, Gibbs, M. and Smith, R., *Navigating the Internet*, Chaps. 3, 4 and 9, pp. 35–86, and 158–172 (Sams Publishing, IN, 1993).

Referring to FIG. 3, the database dependency resolution method first identifies and reads the proper relationship database in step 210. For instance, if the file server 100 employs a file based operating system, such as MS-DOS or Unix, the data files may be organized into corresponding file directories with corresponding relationship databases existing for each of the file directories. In such a file server 100 the proper relationship database would be the one residing in the particular directory in which the user has accessed or is viewing. In an alternative arrangement in the file server 100, relationship databases may be maintained for a particular directory and all or particular ones of respective subdirectories. In addition, a single relationship database can be used for all the data files in the file server 100 whether or not the file server 100 maintains data files within a directory format.

The database dependency resolution program then generates a data structure representing the relationships identified in the relationship database in step 220. The data structure is effectively organized as a relationship graph, such as that illustrated in FIG. 4, which is described in detail below. Suitable mapping routines for generating such a data structure could be readily generated, as is known in the art. Such a mapping routine is contained in the Appendix attached hereto. The mapping routine in the attached Appendix generates an array of files with each file containing a list of corresponding related symbols, and a hash table providing a cross-reference between the symbols and the array files.

After generating the data structure, the database dependency routine then retrieves the symbol of interest entered or selected by the user in step 230. The symbol of interest may have been entered by the user at the initiation of the database dependency resolution method. Then, in step 240, the database dependency resolution method traverses the data structure based on the symbol of interest using a transitive closure technique to identify and retrieve the corresponding collection of data file names. Transitive closure techniques are known graph algorithms which have been previously used by program linkers when building software programs that call precompiled library subroutines. One suitable transitive closure routine is described in Aho, A., Hopcroft, J., and Ulman, J., *The Design and Analysis of Computer Algorithms*, Sect. 5.7, pp. 198–199 (Addison-Wesley, 1974), which is incorporated by reference herein. The data file names retrieved in step 240 include the data file represented by the symbol of interest as well as all data files that are directly and indirectly related to that data file.

The retrieved data file names may then be used to obtain additional information about the corresponding data files, such as file size, file type and creation date, as indicated in the optional step 250. This information may be obtained by making the necessary calls to the appropriate file server operating system routines in a manner well known in the art. Then, in step 260, the symbol of interest, retrieved data file names and any additionally obtained information, are arranged in a predetermined display format. The arranged information is then displayed on the user's display in step 270. The database dependency resolution method of FIG. 3 may be performed while a user is on-line with the file server to provide a convenience of enabling the user to substantially instantaneously identify which data files correspond to a particular symbol.

In applying the database dependency resolution method of FIG. 3 to the above relationship database in Table A, the method would first read the relationship database as indicated in step 210. Then, the method generates a data structure corresponding to the relationship database as indicated in step 220. A graph 300 representing such a data structure is illustrated in FIG. 4.

Figure 4:
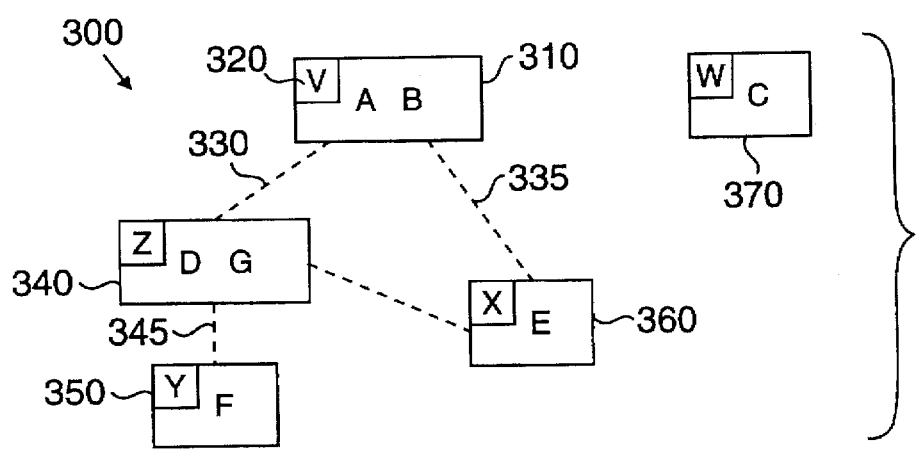
FIG. 4 is a graph representing an exemplary data structure that may be generated while performing the method of FIG. 3.

In FIG. 4, each data file is represented by a box, such as the box 310, with the data file name appearing in a region in the upper-left corner of the box, such as region 320, and the corresponding symbol names appearing in the center of the box. For example, box 340 of FIG. 4 represents the data file Z that is represented by symbols D and G as indicated in Table A. The dependency or relation of one data file to another is represented by a broken line, such as line 330, between the corresponding data file boxes. Further, a data file that is dependent on another data file appears higher on the page than the other data file. For example, data file Z 340 is dependent on and appears higher on the page than data files 350 and 360 represented by the symbols E and F. Note that data file W 370 is not dependent on any other file and therefore, no relationship lines extend from it.

After generation of the data structure, the method retrieves the symbol of interest entered or selected by the user, such as the symbol B. The symbol B represents the data file V 310, as indicated in step 220. The symbol of interest is used by a transitive closure technique to traverse the data structure and retrieve the corresponding file name and the names of any related data file as stated in step 240. Since the symbol B corresponds to the data file V 310, the data file name V will be retrieved. Also, since the data file V 310 is directly dependent on or related to the symbols D and E as indicated by relationship lines 330 and 335, the corresponding data files names Z and X are also retrieved. Further, since the data file name Y is dependent on the symbol F as indicated by the relationship line 345, then the corresponding data file name Y is also retrieved. Note that the data file Z is also dependent on the symbol E, the data file X, which has already been retrieved due to its direct relation to the data file V 310. Therefore, the retrieved list of data file names for the symbol B are V, Z, X and Y.

Information concerning each of the file names is then obtained as indicated by step 250. The obtained data file information may include the creation dates and size corresponding to the retrieved data file names. The retrieved data file names and the corresponding obtained information are then arranged into a predetermined format in step 260. The predetermined format may be a suitable format for direct display on the file server 100 or data format for transmission over the Internet to a remote user. Lastly, the information in the predetermined format is then displayed or transmitted for display, as indicated in step 270. The information displayed may be as follows:

| Symbol | Data Files | Creation Date | Size (KB) |
|--------|-----------|---------------|-----------|
| B | V | 1994 | 2.8 |
|   | Z | 1993 | 1.2 |
|   | X | 1993 | 4.3 |
|   | Y | 1992 | 9.2 |

The usage of a transitive closure technique for identifying names of related data files enables the present invention to employ a relationship database of minimal size as well as simple reading and data structure mapping routines. The required relationship database may require minimal memory space because information concerning symbols of only directly related data files and not indirectly related data files need be maintained for each data file. Since the database needs to contain only the directly related symbols, the database can be automatically generated by a simple routine which scans each data file and identifies the symbols of the related data files indicated therein. Thus, the present invention not only provides a convenience to users in identifying the names of data files contained in a particular collection but also utilizes a compact relationship database that is a minimal burden to the file server administrator in its creation and maintenance.

The database dependency resolution method of the present invention may be implemented in a shell script and be accessible to remote users accessing the file server 100 of FIG. 1 in a substantially similar manner as standard FTP or WWW commands. In the alternative, the method may be implemented as a computer program, such as a C language program, that operates above the FTP or WWW command programs to retrieve the commands received from the user remote computer. In such an arrangement, all standard FTP or WWW commands are passed along to the appropriate routines, while the virtual file listing command is directed to, and processed by, the database dependency resolution method. In addition, the method may be implemented in an operating system of the processing system to be accessible to users in a substantially similar manner as standard directory file listing routines.

Although one embodiment of the method and system of the present invention has been described in detail above, many modifications to the described embodiment are possible without departing from the teaching of the present invention. All such modifications are intended to be encompassed by the claimed invention. For example, the method of the present invention may be used to display a list of corresponding data files for each available symbol by performing the method on each symbol listed in the relationship database. Further, although the present invention was described with respect to a file server on the Internet, any processing system in which data files are maintained that may depend on other data files may used with the present invention.

APPENDIX

```
/* This reads from stdin a relationship database file and builds 1) an array
of files, each with a list of symbols referenced, and 2) a hash table
mapping defined symbols into files. Now, to compute the transitive
closure of a list of symbols given as arguments on the command line,
keep a stack of symbols yet to be resolved, a stack of files yet to be
expanded, and a list of files processed. */
#include <string.h>
#include <stdio.h>
struct HashEntry {char* Key; int Code;};
typedef struct HashEntry *HashTable;
extern char*    Fgets(char*,int,FILE*);
extern void     hashdel(HashTable*,int);
extern int      hashins(HashTable*,int,char*,int);
extern int      hashasu(char*,int);
extern int      hashpjw(char*,int);
extern int      hashsrch(HashTable*,char*);
extern void*    Malloc(size_t);
extern void*    Realloc(void*,int);
extern char*    Strdup(char*);
typedef struct{
    char *name;
    char **ref;    /* array of symbols referenced by this file */
    int nref;
    int done;      /* has this already been added to hit? */
} File;
typedef struct{
    File *file;
    int nfile;
    HashTable Def;    /* symbol —> index of file defining it */
} Dependencies;
static void
save_refs(File *f, int nref, char **ref)
{
    f->ref = (char**)Malloc(nref*sizeof(*f->ref));
    memcpy(f->ref,ref,nref*sizeof(*f->ref));
    f->nref = nref;
}
void
getdepend(Dependencies *d)
{
    int i; /* HashTable index */
    int nf = 0; /* index of file being read */
    int maxf = 1000; /* guess at an upper bound for nf */
    int nref, maxref = 5000; /* guess at an upper bound for nref */
    int linelen;
    char *name;
    char line[1000];
    char **ref = Malloc(maxref*sizeof(*ref));
    File *f = Malloc(maxf*sizeof(*f));
    HashTable D = 0;
    while(Fgets(line,sizeof(line),stdin)!=NULL){
        if(line[0]==0 || line[0]=='#') continue;
        linelen = strlen(line);
        if(line[linelen-1]=='\n')
            line[--linelen] = '\0';
        name = Strdup(line+2);
        switch(line[0]){
        case 'F':
            if(nf>0)
                save_refs(&f[nf],nref,ref);
            nref = 0;
            nf++;
            if(nf>=maxf){
                maxf *= 2;
                f=Realloc(f,maxf*sizeof(*f));
            }
            f[nf].name = name;
            f[nf].done = 0;
            /* FALL THROUGH (file implicitly defines own name) */
```

APPENDIX-continued

```
        case 'D': i = hashsrch(&D,name);
            if(i<0) hashins(&D,i,name,nf);
            break;
        case 'R':
            nref++;
            if(nref>=maxref){
                maxref *= 2;
                ref=Realloc(ref,maxref*sizeof(*ref));
            }
            ref[nref-1] = name;
            break;
        /* ignore other lines */
        }
    }
    if(nf>0 && nref>0)
        save_refs(&f[nf],nref,ref);
    free(ref);
    d—>file = f;
    d—>nfile = nf;
    d—>Def = D;
}
typedef struct{
    char **p;
    int np, maxp;
} stack;
static void
new_stack(stack *s)
{
    s—>maxp = 1000;
    s—>p = (char**)Malloc(s—>maxp*sizeof(char*));
    s—>np = 0;
}
static void
push(char *p, stack *s)
{
    if(s—>np==s—>maxp){
        s—>maxp *= 2;
        s—>p = (char**)Realloc(s—>p,s—>maxp*sizeof(char*));
    }
    s—>p[s—>np++] = p;
}
static char*
pop(stack *s)
{
    if(s—>np==0) return 0;
    return(s—>p[-s—>np]);
}
static void
resolve(Dependencies *d, stack *hit, stack *need)
{
    int i, k;
    char *r;
    File *f;
    while(r = pop(need)){
        i = hashsrch(&d—>Def,r);
        if(i>0){
            f = &d—>file[d—>Def[i].Code];
            if(!f—>done){
                f—>done = 1;
                push(f—>name,hit);
                for(k = 0; k<f—>nref; k++)
                    push(f—>ref[k],need);
            }
        } /* else unsatisfied external */
    }
}
static int
cmp(const void*a, const void*b)
{
    return(strcmp(*(char **)a, *(char **)b));
}
void
main(int argc, char**argv)
{
    Dependencies D;
    stack hit, need;
    int i;
    new_stack(&hit);
    new_stack(&need);
    while(argc>1)
        push(argv[--argc],&need);
    getdepend(&D);
    resolve(&D,&hit,&need);
    qsort(hit.p,hit.np,sizeof(char*),cmp);
    for(i = 0; i<hit.np; i++)
        printf("%s\n",hit.p[i]);
    exit(0);
}
```

We claim:

1. A database dependency resolution method for identifying related data files based on a corresponding symbol, the relationships of the data files being set out in a relationship database containing data file names, at least one symbol corresponding to the data file name, and symbol names corresponding to related data files, the method comprising:

generating a data structure representing relationship hierarchies of data files and symbols as contained in the database;

retrieving the symbol of interest;

traversing the relationship hierarchies of the generated data structure using a transitive closure technique to retrieve information concerning the name of the data file corresponding to the symbol of interest and the names of any directly and indirectly related data files; and displaying the retrieved information.

2. The method of claim 1, further comprising identifying the appropriate database before the step of generating the data structure.

3. The method of claim 2, wherein the appropriate database is identified by which data file directory a user requesting the identity of the related files has accessed.

4. The method of claim 1, further comprising arranging the retrieved information into a predetermined format before the step of displaying the information.

5. The method of claim 1, further comprising:

transmitting the arranged information to a remote user processing system over a network connecting the remote user processing system and a processing system maintaining the database, wherein the symbol of interest is selected by a remote user on the remote user processing system and wherein the step of displaying the arranged information is performed by the remote user processing system.

6. The method of claim 1, further comprising:

obtaining additional attribute information concerning the data files corresponding to the retrieved data file names; and including the obtained attribute information with the retrieved information, wherein the steps of arranging and displaying the retrieved information further arrange and display the obtained attribute information.

7. The method of claim 6, wherein the step of obtaining the attribute information includes making calls to the data file management routines of the processing system to return the attribute information based on the data file names.

8. The method of claim 1, wherein the step of generating the data structure includes:

reading the database to identify the data file names, symbol names and symbol names for the related data files, wherein the symbol names of the related files corresponding to a particular data file are only those symbol names for data files that are directly related to that particular data file.

9. The method of claim 1, further comprising executing the steps of the method by a file transfer protocol implementation in a processing system maintaining the database.

10. The method of claim 1, further comprising executing the steps of the method by a data file management portion of the operating system in a processing system maintaining the database.

11. A processing system for identifying and displaying names of related data files based on a corresponding symbol comprising:

at least one memory storage device, the storage device storing a plurality of processing system instructions, collections of data files and at least one database, wherein the relationships of the data files are set out in a corresponding database which contains the data fie names, at least one symbol corresponding to the data file name, and symbol names corresponding to related data files; and at least one processing unit for controlling the displaying of the data file names and executing at least one of said processing system instructions from said memory device, the processing unit being operable to:

generate a data structure representing relationship hierarchies of data files and symbols as contained in the appropriate corresponding database;

retrieve the symbol of interest from a user;

traverse the relationship hierarchies of the generated data structure using a transitive closure technique to retrieve information concerning the name of the data file corresponding to the symbol of interest and the names of any directly and indirectly related data files; and arrange the retrieved information into a predetermined format for displaying.

12. The processing system of claim 11, wherein the processing unit is capable of identifying the corresponding relationship database in the memory device based on a particular data file directory the user has accessed.

13. The processing system of claim 11, wherein the processing unit is capable of receiving the symbol of interest from a remote user over a network connected to the processing system, and wherein the processing system arranges the information for transmission over the network to a processing system of the remote user for displaying.

14. The processing system of claim 13, wherein the instructions for identifying and displaying the data file names in a collection of data files represented by a corresponding symbol operate in conjunction with the instructions corresponding to file transfer over the network.

15. The processing system of claim 11, wherein the instructions for identifying and displaying the data file names in a collection of data files represented by a corresponding symbol operate in conjunction with the instructions corresponding to data file management in an operating system of the processing system.

16. The processing system of claim 11, wherein the processing system is capable of obtaining attribute information of each retrieved file name by making the appropriate calls to data file management routines of the processing system.

17. The processing system of claim 11, wherein each database includes the data file names, symbol names and symbol names for the related data files, wherein the symbol names of the related files corresponding to a particular data file are only those symbol names for data files that are directly related to that particular data file.

18. A database dependency resolution method for identifying related data files based on a corresponding symbol of interest, the relationships of the data files being set out in a relationship database containing data file names, at least one symbol corresponding to the data file name, and symbol names corresponding to related data files, the method comprising:

generating a data structure representing relationship hierarchies of data files and symbols as contained in the database;

retrieving the symbol of interest;

traversing the relationship hierarchies of the generated data structure using a transitive closure technique to retrieve information concerning the name of the data file corresponding to the symbol of interest and the names of any directly and indirectly related data files; and transmitting the retrieved information to a remote user processing system over a network connecting the remote user processing system and a processing system maintaining the database, wherein the symbol of interest is selected by a remote user on the remote user processing system.

19. The method of claim 18, wherein the data structure is based on symbols of only directly related data files.

* * * * *